United States Patent
Feng et al.

(10) Patent No.: US 11,054,607 B2
(45) Date of Patent: Jul. 6, 2021

(54) LIGHT-CANCELLING RING FOR RETAINING CAMERA LENS AND LENS MODULE USING SAME

(71) Applicant: HON HAI PRECISION INDUSTRY CO., LTD., New Taipei (TW)

(72) Inventors: Ya-Lan Feng, New Taipei (TW); Chun-Cheng Ko, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 168 days.

(21) Appl. No.: 16/562,890

(22) Filed: Sep. 6, 2019

(65) Prior Publication Data
US 2020/0158988 A1 May 21, 2020

(30) Foreign Application Priority Data
Nov. 16, 2018 (CN) .......................... 201811371656.9

(51) Int. Cl.
*G02B 7/02* (2021.01)

(52) U.S. Cl.
CPC ............. *G02B 7/026* (2013.01); *G02B 7/021* (2013.01)

(58) Field of Classification Search
CPC .......... G02B 7/00; G02B 7/021; G02B 7/026; G02B 7/02
USPC ........................................................ 359/830
See application file for complete search history.

(56) References Cited

U.S. PATENT DOCUMENTS

| | | | | | |
|---|---|---|---|---|---|
| 4,226,505 A | * | 10/1980 | Hashimoto | ............... | G02B 7/14 359/830 |
| 4,303,306 A | * | 12/1981 | Ookawa | .................. | G02B 7/026 359/819 |
| 4,737,017 A | * | 4/1988 | Nagasaka | .............. | G02B 7/026 359/811 |
| 6,144,509 A | * | 11/2000 | Baker | ..................... | G02B 7/026 359/819 |
| 6,166,868 A | * | 12/2000 | Holderer | ................ | G02B 7/026 359/819 |
| 6,392,825 B1 | * | 5/2002 | Trunz | ..................... | G02B 7/026 359/811 |
| 6,503,383 B1 | * | 1/2003 | Holderer | ................ | G02B 7/026 205/70 |
| 6,900,953 B2 | * | 5/2005 | Okumura | ............... | G02B 7/026 353/100 |
| 7,079,332 B2 | * | 7/2006 | Tanaka | ................... | G02B 7/021 359/811 |

(Continued)

FOREIGN PATENT DOCUMENTS

| | | |
|---|---|---|
| CN | 206339821 U | 7/2017 |
| TW | 201118449 A | 6/2011 |

*Primary Examiner* — William R Alexander
(74) *Attorney, Agent, or Firm* — ScienBiziP, P.C.

(57) ABSTRACT

A retaining ring for retaining lenses in a lens module carries an internal shape reducing the incidence of stray reflected light. The through hole in the retaining ring allows light to pass and a prismatic protrusion is disposed on a wall of the through hole. The protrusion has first and second inclined surfaces each at a specific angle. Acute angle θ1 is formed between the first inclined surface and end surface of ring, and acute angle θ2 is formed between the second inclined surface and other end surface of ring. Relationship between the acute angles are θ1>θ2, and 60°≤θ1+θ2≤80°. A lens module using such a retaining ring is also provided.

10 Claims, 7 Drawing Sheets

(56) References Cited

U.S. PATENT DOCUMENTS

| | | | | |
|---|---|---|---|---|
| 7,088,530 | B1* | 8/2006 | Recco | G02B 7/021 |
| | | | | 359/784 |
| 7,990,632 | B2* | 8/2011 | Monti | G02B 7/021 |
| | | | | 359/819 |
| 2004/0027687 | A1* | 2/2004 | Bittner | G02B 7/102 |
| | | | | 359/694 |
| 2005/0018320 | A1* | 1/2005 | Okumura | G02B 7/026 |
| | | | | 359/819 |
| 2005/0280908 | A1* | 12/2005 | Tanaka | G02B 7/021 |
| | | | | 359/811 |
| 2010/0214677 | A1* | 8/2010 | Monti | G02B 7/026 |
| | | | | 359/820 |
| 2016/0091690 | A1* | 3/2016 | Nakajima | G02B 7/028 |
| | | | | 359/754 |
| 2020/0285029 | A1* | 9/2020 | Watanabe | G02B 7/026 |

* cited by examiner

LIGHT-CANCELLING RING FOR RETAINING CAMERA LENS AND LENS MODULE USING SAME

FIELD

The subject matter herein generally relates to imaging.

BACKGROUND

A lens module is often fixed by UV glue to keep the lenses in a lens group together. If the glue is thin or the glue has a high reflectivity, it will result in flares which come from transmittance of light rays through the nearest lens to the image sensor, thereby affecting the lens imaging quality. A retainer is usually assembled to the lens closest to the image sensor. With the retainer, the lens group is reinforced, meanwhile, and most flares are blocked and reduced.

In the molding process of retainer, it is difficult to make the structure of inner section of a retainer to be an absolutely sharp tip because the absolutely sharp tip does not really exist. The smaller the angle of the tip is, the harder the molding process is. Moreover, it has extreme difficulty to get both similar and higher sharpness status of tips of retainer during mass production due to the limit of molding process. On the other hand, increased reflection of light rays comes with an unsharp tip of the retainer, which is also followed by periodic flares.

Therefore, there is room for improvement.

BRIEF DESCRIPTION OF THE DRAWINGS

Implementations of the present technology will now be described, by way of embodiments, with reference to the attached figures.

DETAILED DESCRIPTION

The present disclosure is made in conjunction with the accompanying drawings. Specific embodiments of the present disclosure are described.

In the following description, when an element is described as being "fixed to" another element, the element can be fixed to the another element with or without intermediate elements. When an element is described as "connecting" another element, the element can be connected to the other element with or without intermediate elements.

Without a given definition otherwise, all terms used have the same meaning as commonly understood by those skilled in the art. The term "and/or" means including any and all combinations of one or more of associated listed items.

Figure 1:
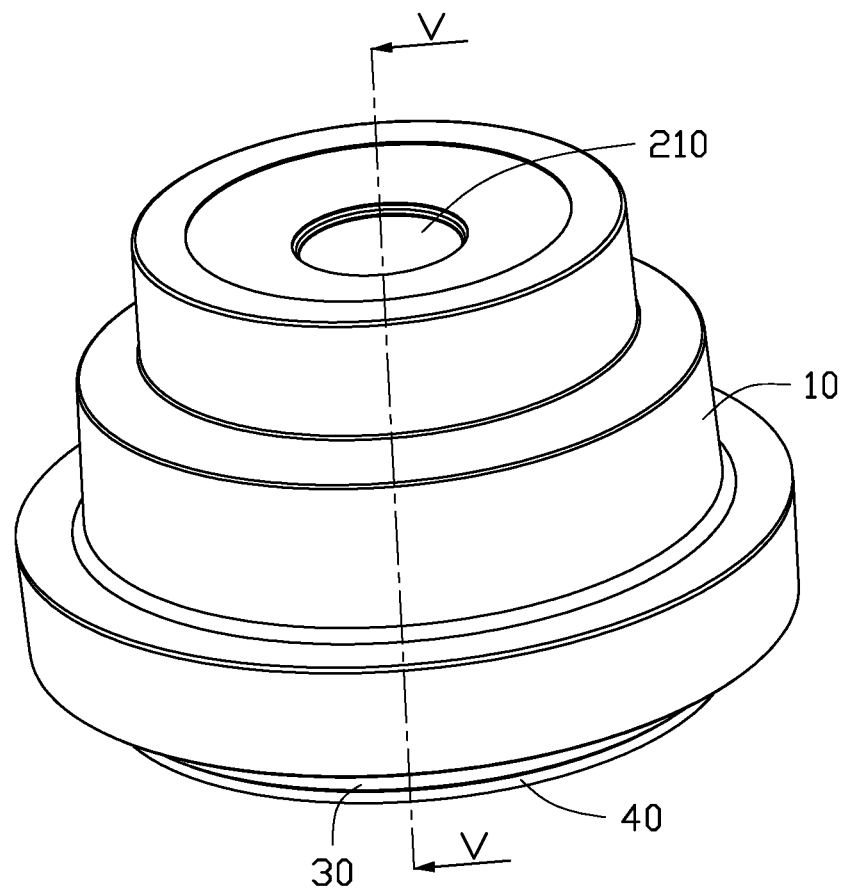
FIG. 1 is an isometric view of a lens module according to an embodiment of the present disclosure.
Figure 2:
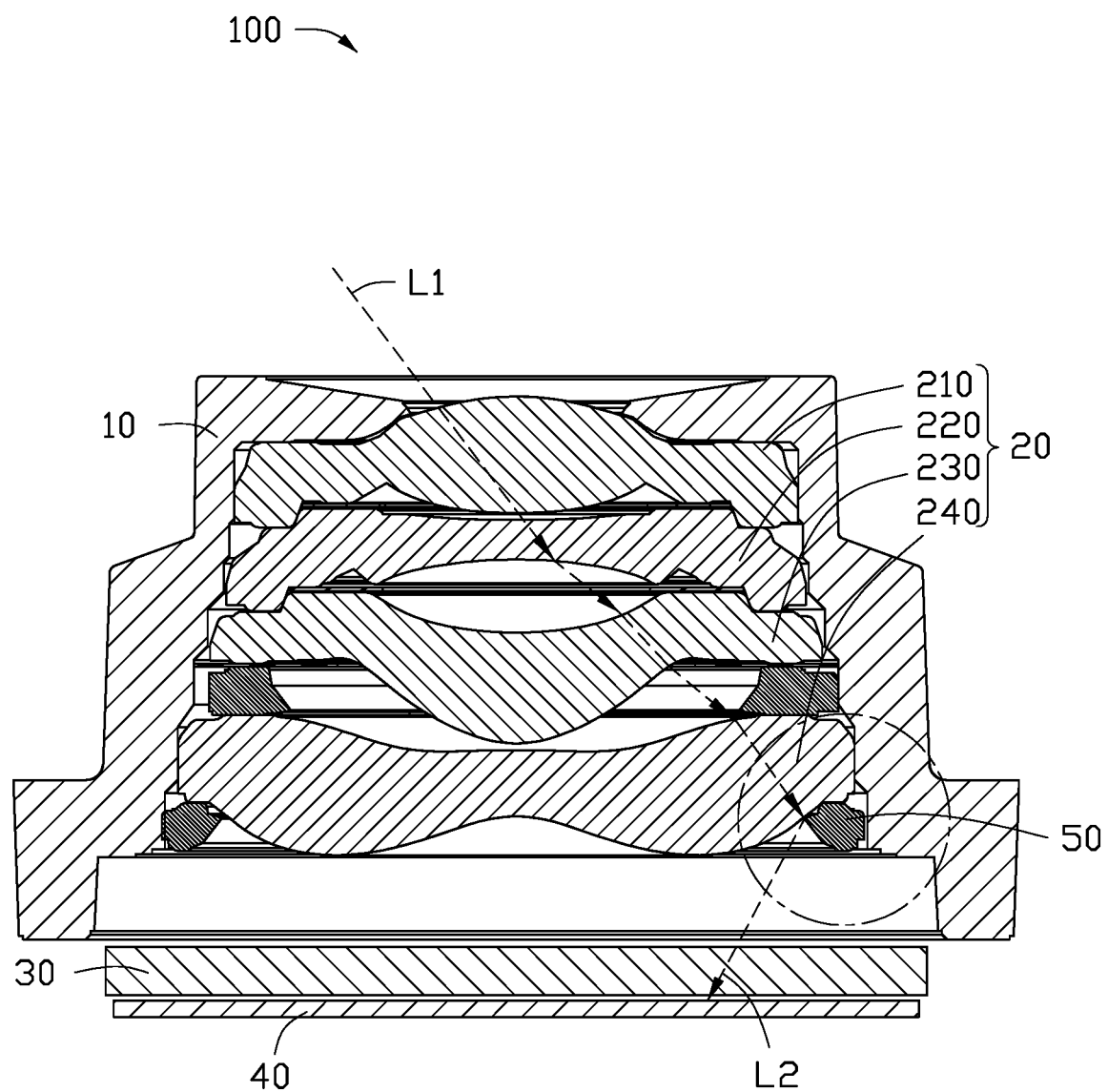
FIG. 2 is a cross-sectional view along line V-V of FIG. 1, illustrating an optical path of light.

Referring to FIGS. 1 and 2, the lens module 100 includes a lens barrel 10, a lens group 20, a filter 30, an image sensor 40, and a retaining ring 50.

The lens group 20, the retaining ring 50, the filter 30, and the image sensor 40 are sequentially arranged from object to image sides of the lens module 100.

The lens group 20 includes a plurality of lenses. The lenses are housed and fixed in the lens barrel 20. The retaining ring 50 is fixed to the lens group 20 on the innermost side of the lens module 100, to prevent the lens group 20 falling out of the lens barrel 10. An outer diameter of the retaining ring 50 matches the size of an inner wall of the lens barrel 10 to meet gap requirement of the optical design.

Figure 3:
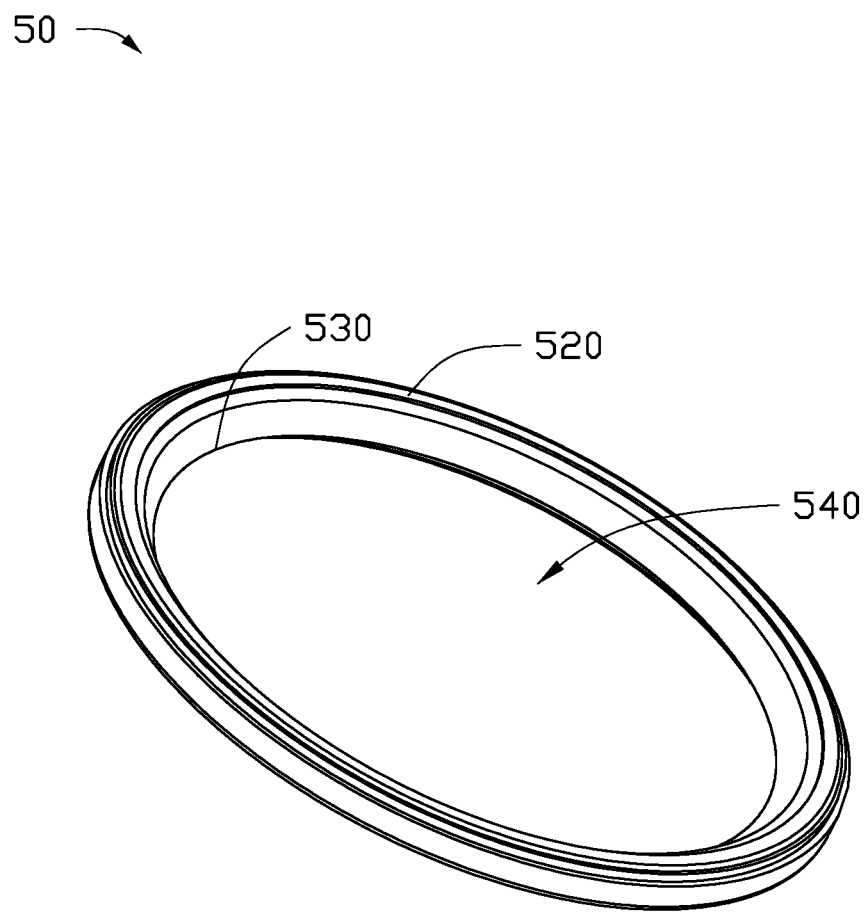
FIG. 3 is an isometric view of a retaining ring in the lens module of FIG. 1.
Figure 4:
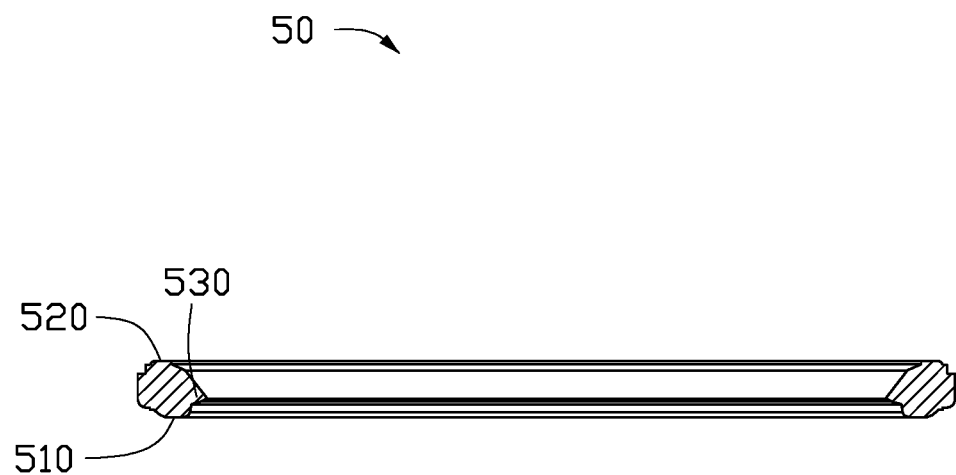
FIG. 4 is a cross-sectional view of the retaining ring of FIG. 3.
Figure 5:
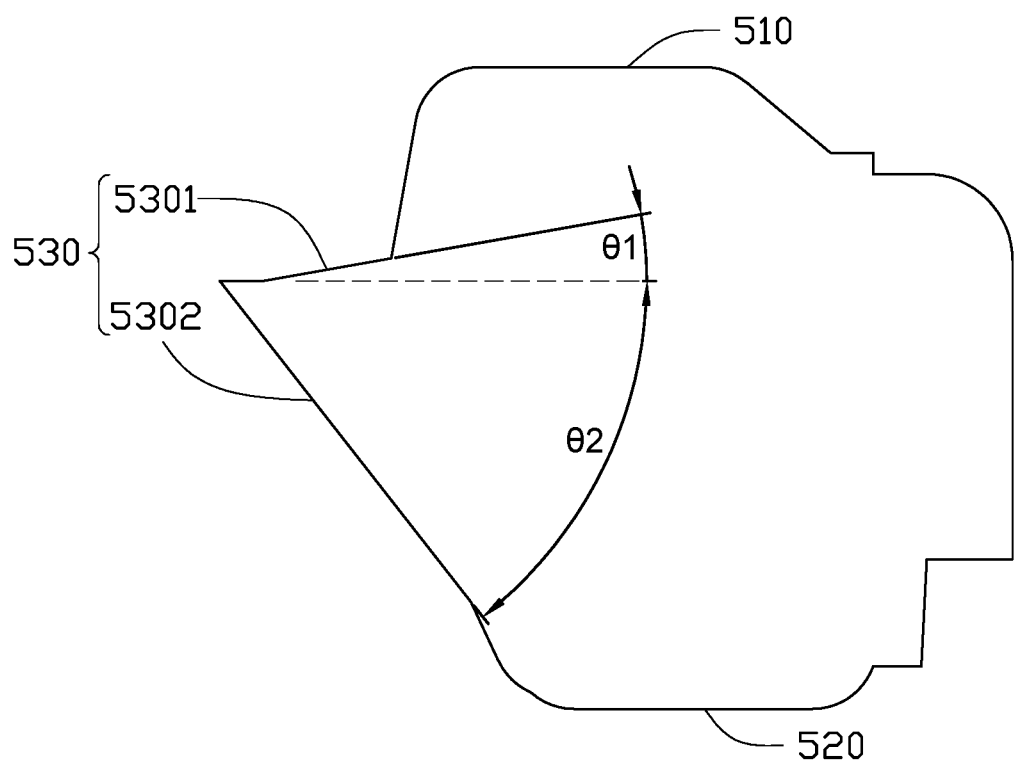
FIG. 5 is a cross-sectional view of part of the retaining ring of FIG. 3.

Referring also to FIGS. 3 to 5, the retaining ring 50 includes a first end surface 510 and a second end surface 520 opposite and parallel to the first end surface 510. The middle portion of the retaining ring 50 defines a through hole 540. The through hole 540 runs through both the first end surface 510 and the second end surface 520 for allowing light to pass. The retaining ring 50 further includes a prismatic protrusion 530 disposed on the wall of the through hole 540.

The prismatic protrusion 530 includes a first inclined surface 5301 and a second inclined surface 5302. One side of the first inclined surface 5301 is connected to the first end surface 510. One side of the second inclined surface 5302 is connected to the second end surface 520, and other side of the second inclined surface 5302 is connected to other side of the first inclined surface 5301. In the embodiment, the first inclined surface 5301 can be connected to the first end surface 510 directly or indirectly. The second inclined surface 5302 can be connected to the second inclined surface 5302 directly or indirectly. A first acute angle $\theta 1$ is formed between the first inclined surface 5301 and the first end surface 510, and a second acute angle $\theta 2$ is formed between the second inclined surface 5302 and the first end surface 510. Relationships between the first acute angle $\theta 1$ the second angle $\theta 2$ are $\theta 2 > \theta 1$, and $60° \leq \theta 1 + \theta 2 \leq 80°$.

In the embodiment, the first acute angle $\theta 1$ is 20° and the second acute angle $\theta 2$ is 52°.

In the embodiment, the lens group 20 includes a first lens 210, a second lens 220, a third lens 230, and a fourth lens 240. The first lens 210, the second lens 220, the third lens 230, and the fourth lens 240 are sequentially disposed from object to image sides of the lens module 100.

The first lens 210 has a positive dioptric value. The first lens 210 includes a first surface protruding toward the object side and a second surface protruding toward the image side. For example, in the embodiment, the first surface can be a spherical surface protruding toward the object side, and the second surface can be a spherical surface protruding toward the image side.

The second lens 220 has a negative dioptric value. The second lens 220 includes a third surface recessed toward the image side and a fourth surface recessed toward the object side. For example, in the embodiment, the third surface is a curved surface recessed toward the image side, and the fourth surface is a curved surface recessed toward the object side. The fourth surface has a radius of curvature greater than that of the third surface.

The third lens 230 has a positive dioptric value. The third lens 230 includes a fifth surface and a sixth surface that are both recessed toward the image side. For example, in the embodiment, the fifth surface may be a spherical surface that is recessed toward the image side. The sixth surface is a spherical surface recessed toward the image side. The fifth surface has a curvature different from that of the sixth surface.

The fourth lens 240 has a negative dioptric value. The fourth lens 240 includes a seventh surface and an eighth surface. The seventh surface and the eighth surface are both recurved aspherical surfaces.

In the embodiment, the first end surface 510 faces the object side of the lens module 100, and the second end surface 520 faces the image side of the lens 100.

A size of an aperture of the through hole 540 gradually decreases from object to image sides along the first inclined surface 5301. Meanwhile, the size of the aperture of the through hole 540 gradually decreases along the second inclined surface 5302 from image to object sides.

Figure 6:
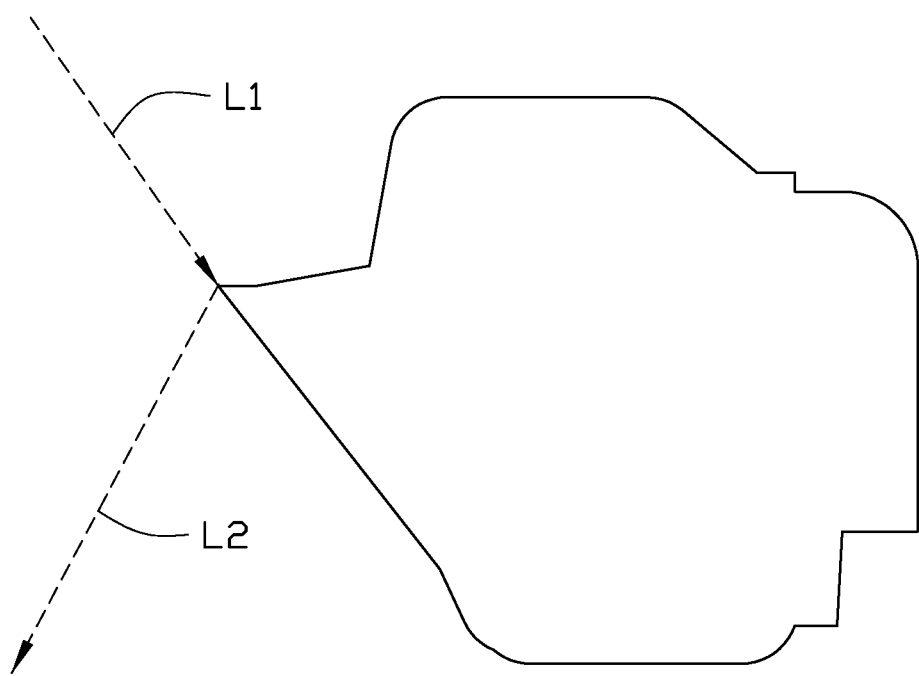
FIG. 6 illustrates an optical path of light reflected by the retaining ring of FIG. 5.
Figure 7:
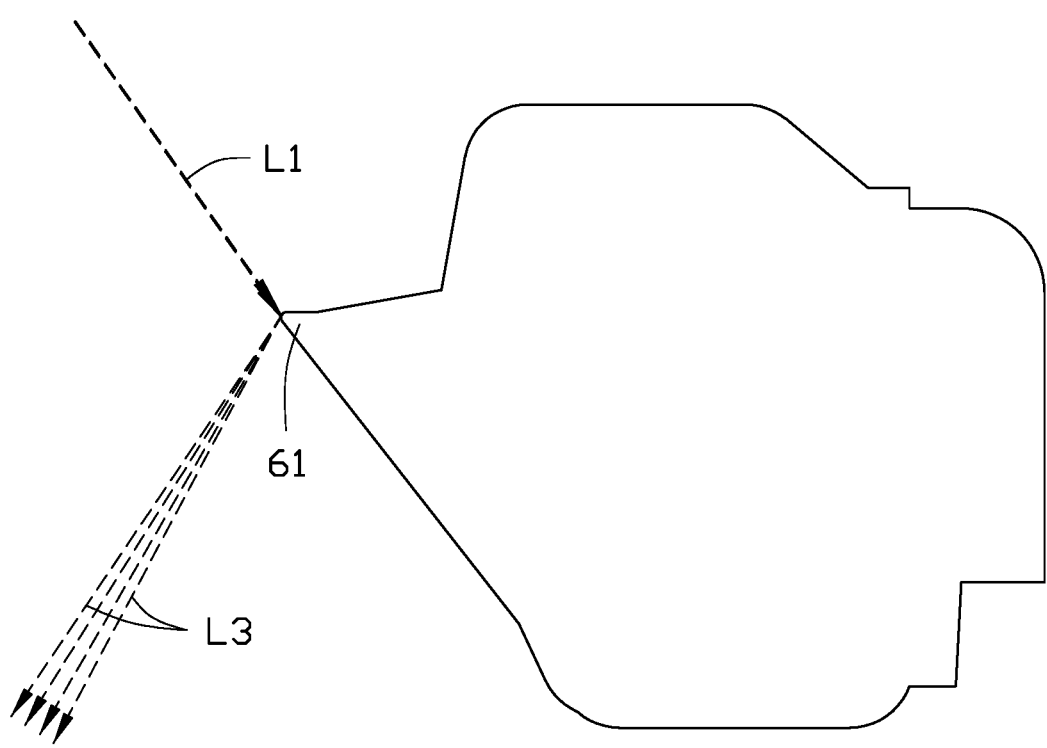
FIG. 7 illustrate, in prior art, optical paths of light reflected by a retaining ring in a lens module.

Referring to FIG. 6 to FIG. 7, the sharp prismatic protrusion 530 reduces the reflectance of light rays to the image sensor 40. Only the light rays L1 reflected by the tip end of the prismatic protrusion 530 enter the image sensor 40, stray light rays to the image sensor 40 are reduced and the image quality is improved.

FIG. 7 indicates the prior art. Since the protruding tip 61 of the inner side of the retaining ring 60 is subjected to molding compromises, the reflected light L1 is diffused and a greater amount of stray light L2 enters the image sensor (not shown).

The provision of the first inclined surface 5301 and the second inclined surface 5302 reduces stray light rays, and the difficulty of forming the retaining ring 50 is also reduced.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. A retaining ring configured for fixing to a lens group of a lens module on a light exiting side of the lens module, the retaining ring comprising a first end surface and a second end surface opposite and parallel to the first end surface, wherein a middle portion of the retaining ring defines a through hole to allow light to pass, the retaining ring further comprises a prismatic protrusion disposed on a wall of the through hole, the prism protrusion comprises a first inclined surface and a second inclined surface, one side of the first inclined surface is connected to the first end surface, one side of the second inclined surface is connected to the second end surface, and other side of the second inclined surface is connected to other side of the first inclined surface, an acute angle θ1 is formed between the first inclined surface and the first end surface, and an acute angle θ2 is formed between the second inclined surface and the first end surface, and relationships between the acute angles θ1 and θ2 are: θ2>θ1, and 60°≤θ1+θ2≤80°.

2. The retaining ring according to claim 1, wherein the first end surface faces an object side of the lens module, and the second end surface faces an image side of the lens module; a size of an aperture of the through hole gradually decreases along the first inclined surface from the object side to the image side.

3. The retaining ring according to claim 1, wherein the first end surface faces an object side of the lens module, and the second end surface faces an image side of the lens module; a size of an aperture of the through hole decreases along the second inclined surface from the image side to the object side.

4. The retaining ring according to claim 1 wherein the acute angle θ1 is 20° and the acute angle θ2 is 52°.

5. The retaining ring according to claim 1, wherein the first inclined surface is connected to the first end surface indirectly, and the second inclined surface is connected to the second end surface indirectly.

6. A lens comprising:
a lens barrel;
a lens group, housed in the lens barrel and comprising a plurality of lenses;
a filter;
an image sensor; and
a retaining ring;
wherein the lens group, the retaining ring, the filter, and the image sensor are sequentially arranged from an object side of the lens module to an image side of the lens module, the retaining ring is fixed to the lens group on a light exiting side of the lens module, the retaining ring comprises a first end surface and a second end surface opposite and parallel to the first end surface, a middle portion of the retaining ring defines a through hole to allow light to pass, the retaining ring further comprises a prismatic protrusion disposed on a wall of the through hole, the prismatic protrusion comprises a first inclined surface and a second inclined surface, one side of the first inclined surface is connected to the first end surface, one side of the second inclined surface is connected to the second end surface, and other side of the second inclined surface is connected to other side of the first inclined surface, an acute angle θ1 is formed between the first inclined surface and the first end surface, and an acute angle θ2 is formed between the second inclined surface and the first end surface, and relationships between the acute angles θ1 and θ2 are: θ2>θ1, and 60°≤θ1+θ2≤80°.

7. The lens according to claim 6, wherein the first end surface faces the object side of the lens module, and the second end surface faces the image side of the lens module; a size of an aperture of the through hole gradually decreases along the first inclined surface from the object side to the image side.

8. The lens according to claim 6, wherein the first end surface faces the object side of the lens module, and the second end surface faces the image side of the lens module; a size of an aperture of the through hole gradually decreases along the second inclined surface from the image side to the object side.

9. The lens module according to claim 6, wherein the acute angle θ1 is 20° and the acute angle θ2 is 52°.

10. The lens module according to claim 6, wherein the first inclined surface is connected to the first end surface indirectly and the second inclined surface is connected to the second end surface indirectly.

* * * * *